(12) United States Patent
Kenyon et al.

(10) Patent No.: US 12,373,745 B2
(45) Date of Patent: Jul. 29, 2025

(54) METHOD AND SYSTEM FOR FACILITATING CONVERGENCE

(71) Applicant: Microsoft Technology Licensing, LLC, Redmond, WA (US)

(72) Inventors: Heidi Kenyon, Bellingham, WA (US); Choo Yei Chong, Redmond, WA (US); Megan Elizabeth Slater, Seattle, WA (US); Christopher Michael Dollar, Renton, WA (US); Wende Ellen Copfer, Woodinville, WA (US); Venkata Sreekanth Kannepalli, Redmond, WA (US); Shabnam Erfani, Kirkland, WA (US); Amy Lieh-An Huang, Seattle, WA (US); Neha Parikh Shah, Glen Ridge, NJ (US); Edward Michael Doran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/707,641

(22) Filed: Mar. 29, 2022

(65) Prior Publication Data

US 2023/0186247 A1 Jun. 15, 2023

Related U.S. Application Data

(60) Provisional application No. 63/289,440, filed on Dec. 14, 2021.

(51) Int. Cl.
*G06Q 10/0631* (2023.01)
*G06N 5/04* (2023.01)
(Continued)

(52) U.S. Cl.
CPC .......... *G06Q 10/0631* (2013.01); *G06N 5/04* (2013.01); *G06N 20/00* (2019.01); *G06Q 10/1095* (2013.01)

(58) Field of Classification Search
None
See application file for complete search history.

(56) References Cited

U.S. PATENT DOCUMENTS

| 8,965,967 | B2 | 2/2015 | Gilbert et al. |
| 9,226,105 | B2 | 12/2015 | Turgman et al. |

(Continued)

FOREIGN PATENT DOCUMENTS

EP 3847600 A1 7/2021

OTHER PUBLICATIONS

Ashbrook, Daniel, and Thad Starner. "Learning significant locations and predicting user movement with GPS." Proceedings. Sixth International Symposium on Wearable Computers,. IEEE, 2002 (Year: 2002).*

(Continued)

*Primary Examiner* — Darlene Garcia-Guerra
(74) *Attorney, Agent, or Firm* — NovoTechIP International PLLC

(57) ABSTRACT

A system and method for facilitating convergence includes receiving a request to schedule a meeting at a meeting time, retrieve at least one of user data, contextual data, facility data and map data, the user data including a list of a plurality of meeting participants for the meeting, providing at least one of the list of the plurality of meeting participants, the meeting time, the user data, and the facility data to a trained machine-learning (ML) model for predicting a location at which two or more of the plurality of meeting participants will be located within a given time period prior to the meeting time, receiving the predicted location as an output (Continued)

from the trained ML model, and identifying a meeting location from among one or more meeting venues based on the predicted location of the two or more of the plurality of meeting participants, and providing the meeting location for display in a first selectable user interface element.

17 Claims, 9 Drawing Sheets

(51) Int. Cl.
  *G06N 20/00* (2019.01)
  *G06Q 10/1093* (2023.01)

(56) References Cited

U.S. PATENT DOCUMENTS

| | | | |
|---|---|---|---|
| 9,955,318 | B1 | 4/2018 | Scheper et al. |
| 10,361,981 | B2 | 7/2019 | Bennett et al. |
| 10,510,026 | B1 | 12/2019 | Adamson et al. |
| 10,845,791 | B2 | 11/2020 | Cohen et al. |
| 10,922,663 | B2 * | 2/2021 | Chittaluru ........ G06Q 10/1095 |
| 10,985,938 | B2 | 4/2021 | Krasadakis |
| 11,138,862 | B2 | 10/2021 | Vanblon et al. |
| 11,164,159 | B2 | 11/2021 | Ma et al. |
| 11,587,210 | B1 * | 2/2023 | Chen ............... G06V 10/26 |
| 12,020,186 | B2 | 6/2024 | Kenyon et al. |
| 2006/0161447 | A1 | 7/2006 | Ohollearn et al. |
| 2009/0055270 | A1 * | 2/2009 | Magdon-Ismail .... G06F 16/957 705/14.27 |
| 2009/0193217 | A1 | 7/2009 | Korecki et al. |
| 2010/0287011 | A1 * | 11/2010 | Muchkaev ............ A63F 13/792 706/45 |
| 2011/0106573 | A1 | 5/2011 | Mcnamara |
| 2011/0112875 | A1 | 5/2011 | Johnson et al. |
| 2012/0290336 | A1 | 11/2012 | Rosenblatt et al. |
| 2014/0058778 | A1 * | 2/2014 | McLarty ............ H04B 7/0857 705/7.19 |
| 2014/0059130 | A1 | 2/2014 | Sheinfeld |
| 2015/0193819 | A1 * | 7/2015 | Chang ............... G06Q 30/0252 705/7.19 |
| 2017/0017928 | A1 * | 1/2017 | Miller ............... G06Q 10/10 |
| 2017/0249714 | A1 * | 8/2017 | Van Hoof ......... G06Q 10/1093 |
| 2017/0293851 | A1 | 10/2017 | Chawla et al. |
| 2017/0308866 | A1 | 10/2017 | Dotan-cohen et al. |
| 2017/0357904 | A1 * | 12/2017 | Adler .................. G06Q 10/109 |
| 2017/0357951 | A1 * | 12/2017 | Patel ..................... H04L 51/046 |
| 2018/0107987 | A1 * | 4/2018 | MacKenzie .... G06Q 10/063116 |
| 2018/0109574 | A1 | 4/2018 | Vigoda et al. |
| 2018/0114177 | A1 | 4/2018 | Somech et al. |
| 2018/0115170 | A1 | 4/2018 | Bacarella et al. |
| 2018/0218734 | A1 | 8/2018 | Somech et al. |
| 2018/0268337 | A1 | 9/2018 | Miller et al. |
| 2018/0285827 | A1 | 10/2018 | Dotan-cohen et al. |
| 2018/0374004 | A1 | 12/2018 | Eone et al. |
| 2019/0130367 | A1 * | 5/2019 | Pell .................... G06Q 10/1095 |
| 2019/0138653 | A1 | 5/2019 | Roller et al. |
| 2019/0318032 | A1 | 10/2019 | Vangala et al. |
| 2019/0340554 | A1 | 11/2019 | Dotan-cohen et al. |
| 2020/0110519 | A1 | 4/2020 | Vangala et al. |
| 2020/0110623 | A1 | 4/2020 | Vangala et al. |
| 2020/0118045 | A1 | 4/2020 | Chung et al. |
| 2020/0213006 | A1 | 7/2020 | Graham et al. |
| 2020/0234523 | A1 * | 7/2020 | Ma ........................ G08G 1/149 |
| 2020/0274726 | A1 | 8/2020 | Setteboun et al. |
| 2020/0287736 | A1 | 9/2020 | Zhuk et al. |
| 2020/0311635 | A1 | 10/2020 | Emig et al. |
| 2020/0334642 | A1 | 10/2020 | Vaananen |
| 2020/0401661 | A1 | 12/2020 | Kota et al. |
| 2021/0209562 | A1 | 7/2021 | Lange et al. |
| 2021/0224754 | A1 * | 7/2021 | Zarakas ................... G06N 3/08 |
| 2021/0256084 | A1 | 8/2021 | Marsh et al. |
| 2021/0319408 | A1 * | 10/2021 | Jorasch .............. G06Q 10/1095 |
| 2021/0399911 | A1 * | 12/2021 | Jorasch .............. H04L 12/1822 |
| 2021/0406840 | A1 * | 12/2021 | DeLuca ........... G06Q 10/06314 |
| 2022/0005275 | A1 | 1/2022 | Atlas et al. |
| 2022/0014571 | A1 | 1/2022 | Polish et al. |
| 2023/0162128 | A1 * | 5/2023 | Beaurepaire ......... G06Q 10/083 705/333 |
| 2023/0186189 | A1 | 6/2023 | Kenyon et al. |
| 2023/0186248 | A1 | 6/2023 | Kenyon et al. |

OTHER PUBLICATIONS

Aliannejadi, Mohammad, Ida Mele, and Fabio Crestani. "Personalized ranking for context-aware venue suggestion." Proceedings of the Symposium on Applied Computing. 2017 (Year: 2017).*
Zhang, Shuo, and Qin Lv. "Hybrid EGU-based group event participation prediction in event-based social networks." Knowledge-Based Systems 143 (2018): 19-29 (Year: 2018).*
Zhang, Jason Shuo, et al. "GEVR: An event venue recommendation system for groups of mobile users." Proceedings of the ACM on Interactive, Mobile, Wearable and Ubiquitous Technologies 3.1 (2019): 1-25 (Year: 2019).*
"International Search Report and Written Opinion Issued in PCT Application No. PCT/US22/044055", Mailed Date: Nov. 25, 2022, 15 Pages.
"International Search Report and Written Opinion Issued in PCT Application No. PCT/US22/044953", Mailed Date: Nov. 28, 2022, 18 Pages.
"International Search Report and Written Opinion Issued in PCT Application No. PCT/US22/046346", Mailed Date: Nov. 28, 2022, 15 Pages.
"What is Meeting Room Booking Software & How to Implement It?", Retrieved From: https://www.workinsync.io/what-is-meeting-room-booking-software-and-how-to-implement-it/#content-1, Oct. 4, 2021, 8 Pages.
"CoWrks Launches 'Converge'—India's First Ever Sophisticated Solution for Business Gatherings and Events", Retrieved From: https://www.prnewswire.com/in/news-releases/cowrks-launches-converge-india-s-first-ever-sophisticated-solution-for-business-gatherings-and-events-866363895.html, Mar. 29, 2019, 02 Pages.
"Non-Final Office Action Issued in U.S. Appl. No. 17/707,710", Mailed Date: Oct. 4, 2023, 14 Pages.
"Non-Final Office Action Issued in U.S. Appl. No. 17/707,779", Mailed Date: Oct. 6, 2023, 8 Pages.
Notice of Allowance mailed on Feb. 16, 2024, in U.S. Appl. No. 17/707,779, 08 pages.
Final Office Action mailed on Apr. 8, 2024, in U.S. Appl. No. 17/707,710, 11 pages.
Non-Final Office Action issued in U.S. Appl. No. 17/707,710, mailed on Jul. 18, 2024, 16 Pages.
Final Office Action mailed on Nov. 12, 2024, in U.S. Appl. No. 17/707,710, 10 pages.
Cross, et al., "Six myths about informal networks—and how to overcome them." MIT Sloan Management Review, vol. 43 No. 3 Apr. 15, 2002, 11 pages.
Edge, et al., "Workgroup Mapping: Visual Analysis of Collaboration Culture.", arXiv:2005.00402 v2, Mar. 19, 2021, 11 pages.
Notice of Allowance mailed on Jan. 29, 2025, in U.S. Appl. No. 17/707,710, 11 pages.

* cited by examiner

400

```
         ┌─────────────┐
    405─▶│    BEGIN    │
         └──────┬──────┘
                ▼
    ┌───────────────────────────────────┐
410─│ RECEIVE A REQUEST TO IDENTIFY     │
    │ MEETING LOCATIONS FOR A MEETING   │
    └───────────────┬───────────────────┘
                    ▼
    ┌───────────────────────────────────┐
415─│ RETRIEVE USER DATA, CONTEXTUAL    │
    │ DATA, FACILITY DATA AND MAP DATA  │
    └───────────────┬───────────────────┘
                    ▼
    ┌───────────────────────────────────┐
420─│ PROVIDE THE RETRIEVED DATA TO A ML│
    │ MODEL TO PREDICT MEETING          │
    │ PARTICIPANT LOCATIONS             │
    └───────────────┬───────────────────┘
                    ▼
    ┌───────────────────────────────────┐
425─│ RECEIVE PREDICTED LOCATIONS AS AN │
    │ OUTPUT FROM ML MODEL              │
    └───────────────┬───────────────────┘
                    ▼
    ┌───────────────────────────────────┐
430─│ IDENTIFY A MEETING LOCATION BASED │
    │ ON PREDICTED LOCATIONS            │
    └───────────────┬───────────────────┘
                    ▼
    ┌───────────────────────────────────┐
435─│ PROVIDE THE MEETING LOCATION FOR  │
    │ DISPLAY                           │
    └───────────────┬───────────────────┘
                    ▼
         ┌─────────────┐
    440─▶│     END     │
         └─────────────┘
```

FIG. 4

METHOD AND SYSTEM FOR FACILITATING CONVERGENCE

CROSS-REFERENCE TO A RELATED APPLICATION

This patent application claims the benefit of priority to U.S. Provisional Application No. 63/289,440 entitled "Method and System for Facilitating Convergence," filed on Dec. 14, 2021, the entirety of which is incorporated herein by reference.

BACKGROUND

In today's flexible and collaborative work and social environments, many users work remotely or from different geographical locations. Providing opportunities for such individuals to converge and connect in person is often challenging. For example, since many of a meeting's attendees may not be located in one place and because it may be unclear to a meeting organizer where each attendee will be working from at a designated time in the future, the meeting organizer may need to reach out to each meeting attendee to determine their location at the meeting time and then spend time identifying a location that is convenient and/or accessible to a majority of the meeting attendees based on their location. This is often a challenging, time-consuming and error-prone task.

Furthermore, it is also often difficult to take into account individual preferences with respect to the meeting location. This is particularly the case when a large number of attendees are invited to a meeting and/or when the organizer is not familiar with the attendees' preferences or restrictions. However, considering the meeting attendees' dietary or mobility restrictions may be an important aspect of organizing a meeting that is accessible to all meeting attendees. Yet, inquiring about each attendee's preferences and/or restrictions may appear intrusive. Furthermore, is time-consuming and difficult to determine each individual's preferences and/or restrictions and to ensure those preferences and/or restrictions are met.

Hence, there is a need for improved systems and methods of facilitating convergence between individuals.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a request to schedule a meeting at a meeting time, retrieve at least one of user data, contextual data, facility data and map data, the user data including a list of a plurality of meeting participants for the meeting, providing at least one of the list of the plurality of meeting participants, the meeting time, the user data, and the facility data to a trained machine-learning (ML) model for predicting a location at which two or more of the plurality of meeting participants will be located within a given time period prior to the meeting time, receiving the predicted location as an output from the trained ML model, and identifying a meeting location from among one or more meeting venues based on the predicted location of the two or more of the plurality of meeting participants, and providing the meeting location for display in a first selectable user interface element.

In yet another general aspect, the instant disclosure presents a method for identifying a meeting location for a meeting. In some implementations, the method includes receiving a request to schedule the meeting at a meeting time, retrieve at least one of user data, contextual data, facility data and map data, the user data including a list of a plurality of meeting participants for the meeting, providing at least one of the list of the plurality of meeting participants, the meeting time, the user data, and the facility data to a trained ML model for predicting a location at which two or more of the plurality of meeting participants will be located within a given time period prior to the meeting time, receiving the predicted location as an output from the trained ML model, and identifying a meeting location from among one or more meeting venues based on the predicted location of the two or more of the plurality of meeting participants, and providing the meeting location for display in a first selectable user interface element.

In a further general aspect, the instant application describes a non-transitory computer readable medium on which are stored instructions that when executed cause a programmable device to perform functions of receiving a request to schedule a meeting at a meeting time, retrieve at least one of user data, contextual data, facility data and map data, the user data including a list of a plurality of meeting participants for the meeting, providing at least one of the list of the plurality of meeting participants, the meeting time, the user data, and the facility data to a trained ML model for predicting a location at which two or more of the plurality of meeting participants will be located within a given time period prior to the meeting time, receiving the predicted location as an output from the trained ML model, and identifying a meeting location from among one or more meeting venues based on the predicted location of the two or more of the plurality of meeting participants, and providing the meeting location for display in a first selectable user interface element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flow diagram depicting an example method for intelligently facilitating scheduling of an in-person meeting.

DETAILED DESCRIPTION

Figure 1A:
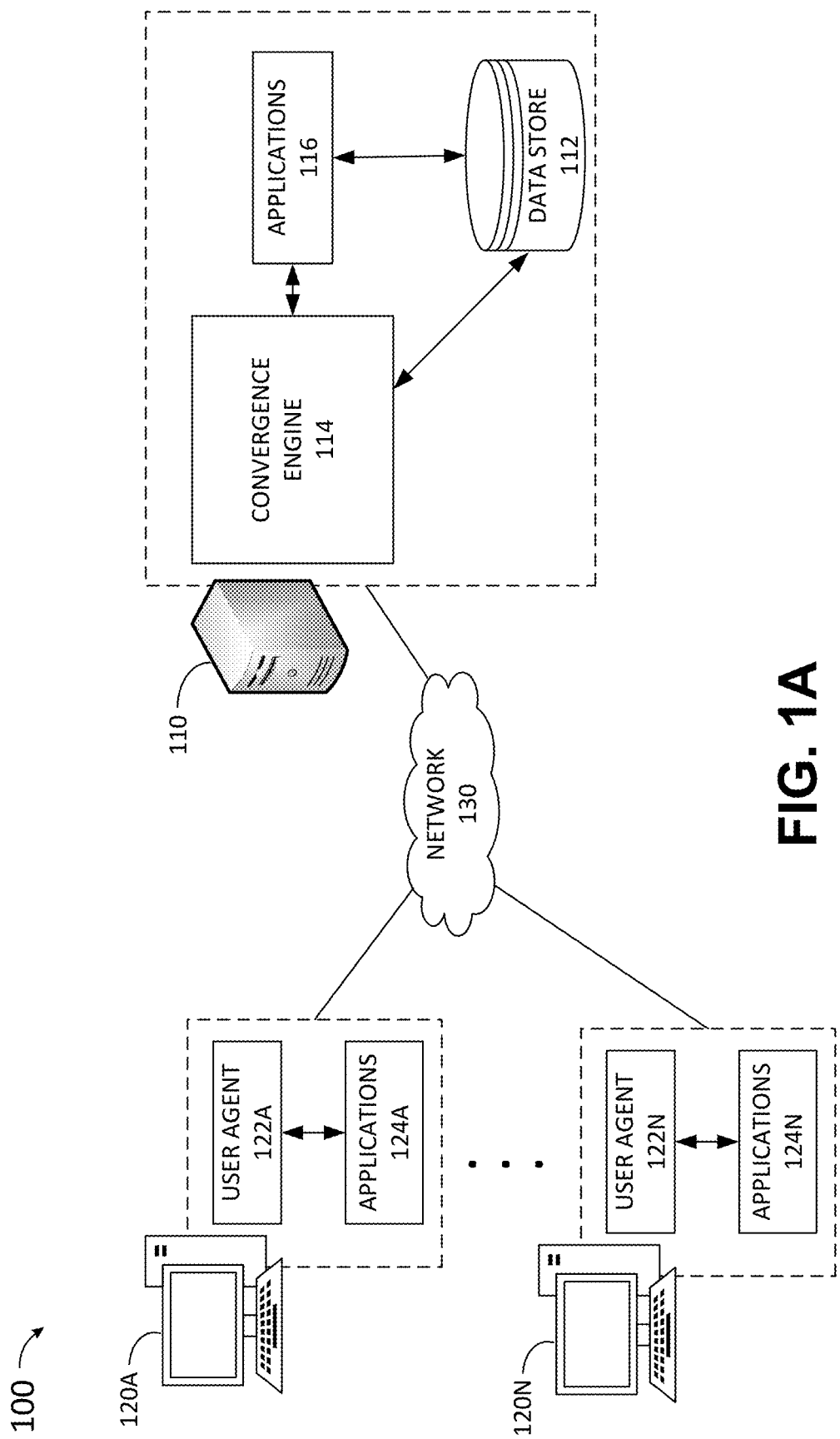
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

With the flexibility provided to employees to work remotely, many individuals are choosing a work location convenient to them based on their needs and/or personal preferences. For example, an individual may work from a coffeeshop, their house, a hotel (if they are traveling) or any other place of their choosing. This location may change on a daily basis, or even during the same day, based on the individual's schedule and personal preferences. As a result, it is often difficult for an organizer of an in-person meeting to identify a location that is convenient and/or accessible to all meeting participants since the organizer may be unaware of the location of each attendee at the designated meeting time. Furthermore, even if the organizer is aware of various meeting attendee locations at the designated time, it may still be time-consuming and difficult to identify a location convenient to all attendees since the organizer may have to take traffic, modes of transportation and/or other factors into account when identifying a meeting location. This may be made further complicated if the meeting involves food consumption and/or if other factors such as different individuals' preferences with respect to outdoor or indoor spaces, modes of transportation, accessibility factors, and the like need to be considered. As a result, to successfully identify a meeting location, an organizer may have to communicate with each meeting attendee to determine their location and/or personal preferences or restrictions, before analyzing the collected information to create a list of locations and requirements. Then, the organizer may need to search for appropriate locations that satisfy the requirements of the meeting attendees. This can be a significantly time-consuming and challenging task. Thus, currently available mechanisms for organizing a meeting require a lot of human input, interaction and analysis to identify locations that are convenient, accessible, and/or acceptable to meeting attendees. Furthermore, often the resulted selection does not optimize for use of every attendee's resource and time. As such, there exists a technical problem of lack of adequate mechanisms for enabling automatic and/or efficient identification of appropriate meeting locations for a meeting with multiple attendees.

To address these technical problems and more, in an example, this description provides technical solutions for automating tasks related to organizing meetings and optimizing users' resources. These solutions may be offered via tools developed for facilitating more efficient convergence between different individuals. In some implementations, this is achieved by utilizing organizational graph data, user specific data, contextual data and/or facility data to identify one or more appropriate locations for conducting an in-person meeting. This may involve predicting different attendee's expected locations during or before the designated meeting time, retrieving map and/or traffic time, retrieving user preferences such as modes of transportation and parking preferences, retrieving user preferences such as dietary restrictions or preferences for specific types of venues, and identifying one or more locations that are geographically convenient to a majority of the attendees (based on their expected location) and/or satisfy a majority of the attendee's preferences. Making these determinations may involve the use of one or more ML models.

The technical solution described herein addresses the technical problem of inefficient use of online meetings and achieves technical effects by providing a system and method for automatically predicting meeting attendees' locations at a given time in the future, automatically determining and/or retrieving meeting attendee's preferences and/or requirements, and automatically identifying a meeting location that is convenient to one or more meeting attendee's and/or meets the meeting attendees' preferences and/or requirements. The technical solution allows a user to navigate quickly and efficiently access data relevant to an ongoing meeting and activate a function to join the meeting in real-time or activate the meeting screen, and therefore improves graphical user interfaces for electronic devices. The technical effects at least include (1) improving the efficiency of using an electronic device to organize an in-person meeting by automatically predicting meeting attendee's location at a given time period in the future and taking the identified locations and/or meeting attendees' preferences and/or requirements into account in identifying potential meeting locations; (2) optimizing use of meeting attendee's resources and time by identifying potential meeting locations that are likely to be geographically close to a majority of meeting attendees; (3) optimizing the meeting organizer's time by automatically making a reservation at a selected meeting location; and (4) providing user interface (UI) elements that increase user efficiency and user satisfaction by enabling the user to review predicted meeting participant locations and/or potential meeting locations on a map.

As will be understood by persons of skill in the art upon reading this disclosure, benefits and advantages provided by such implementations can include, but are not limited to, a technical solution to the technical problems of lack of adequate mechanisms for efficiently and automatically organizing meetings. The benefits made available by these technology-based solutions provide automated, user-friendly and efficient mechanisms for facilitating convergence between people.

FIG. 1A illustrates an example system 100, upon which aspects of this disclosure may be implemented. The system 100 may include a server 110 which may be connected to or include a data store 112 which may function as a repository in which data sets relating to training models, user data, communications data, facility data, meeting location data and the like may be stored. Although shown as a single data store, the data store 112 may be representative of multiple storage devices and data stores which may be connected to each of the various elements of the system 100. Furthermore, although the data store 112 is shown as being part of the server 110, one or more elements (e.g., storage mediums) of the data store 112 may be provided in separate storage servers or other types of servers. Moreover, the server 110 may include a plurality of servers that work together to deliver the functions and services provided by each service or application. Server 110 may operate as a shared resource server located at an enterprise accessible by various computer client devices such as client devices 120A-120N. The server 110 may also operate as a cloud-based server for offering convergence services in one or more applications such as applications 116 and/or applications 124.

The server 110 may include and/or execute a convergence engine 114 which may provide convergence services for users utilizing an application that provides convergence capabilities on their client devices such as client device 120A-120N. The convergence engine 114 may operate to identify or predict a user's location, identify an appropriate meeting location based on various parameters including meeting attendees identified or predicted locations at the time of a meeting, and/or provide mechanisms for making reservations at a selected meeting location via one or more tools such as an application (e.g., applications 116 or applications 124). The convergence engine 114 may include one or more separate elements that perform each of the functions of location prediction, meeting location identification, and/or making reservations, as further discussed below with respect to FIG. 1B.

Each of the client devices 120A-120N may be connected to the server 110 via a network 130. The network 130 may be a wired or wireless network(s) or a combination of wired and wireless networks that connect one or more elements of the system 100. The client devices 120A-120N may be personal or handheld computing device having or being connected to input/output elements that enable a user to interact with various applications (e.g., applications 116 or applications 124A-124N). Examples of suitable client devices 120A-120N include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail in regard to FIGS. 5 and 6.

In some implementations, each of the client devices 120A-120N is associated with a different user. One of more of the client devices 120A-120N may include one or more applications 124A-124N. Each application 124A-124N may be a computer program executed on the client device that configures the device to be responsive to user input to allow a user to use convergence tools such as scheduling a meeting, viewing other users current or future locations, selecting a meeting location, viewing facility occupancy information, and/or reserving a location at a facility. In some implementations, the applications 124A-124N include a local convergence engine for providing some local convergence services. Examples of suitable applications include, but are not limited to, collaborative work environment applications, communications application (e.g., Microsoft Teams or Microsoft Outlook), and the like.

In some examples, applications used for providing convergence services are executed on the server 110 (e.g., applications 116) and are provided via an online service. In some implementations, web applications communicate via the network 130 with a user agent 122A-122N, such as a browser, executing on the client device 120A-120N. The user agent 122A-122N may provide a user interface (UI) that allows the user to interact with applications 116 and may enable applications 116 to provide data to the convergence engine 114 for processing. In some implementations, the convergence engine 114 is included in the applications 116.

Figure 1B:
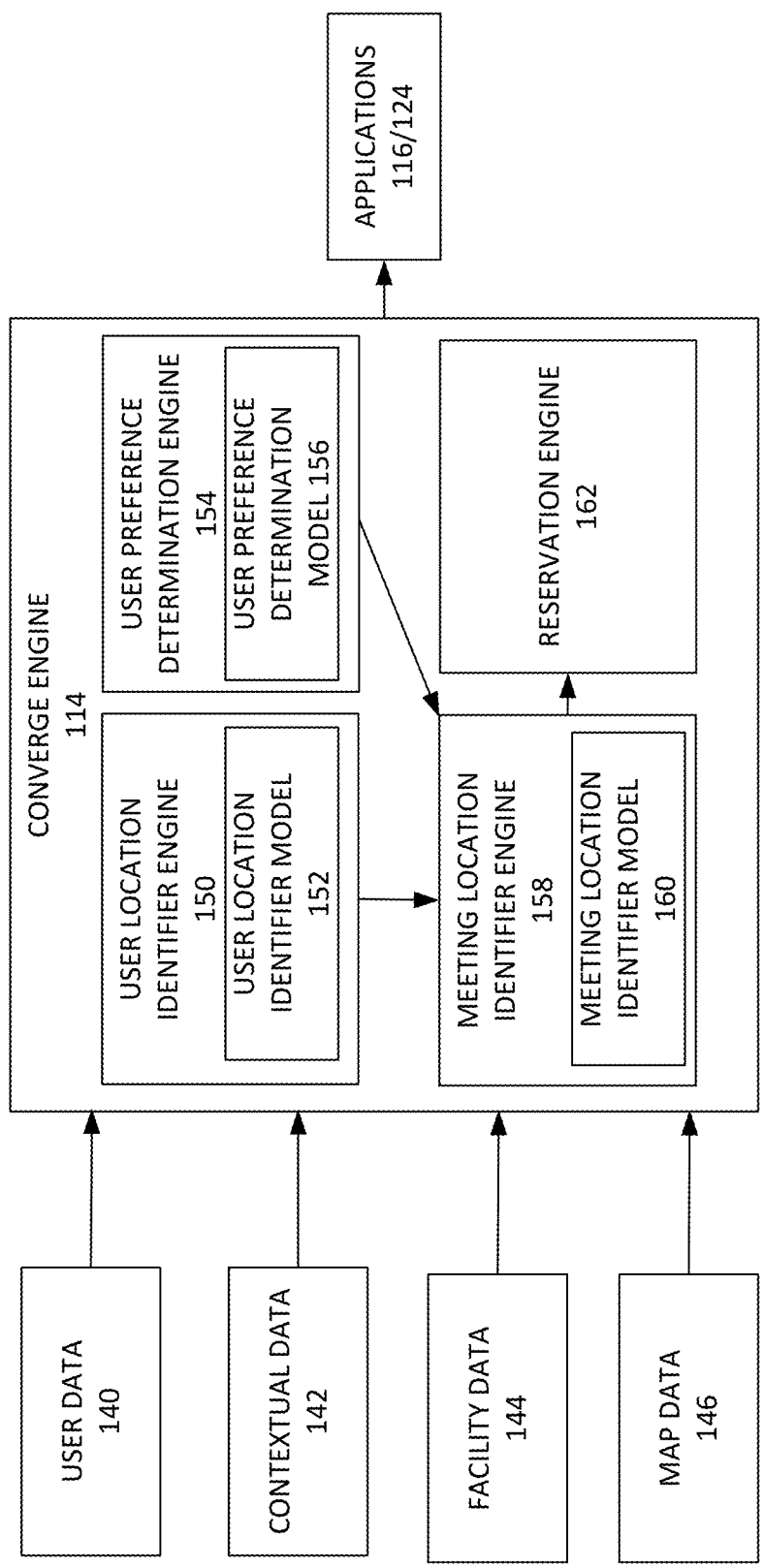
FIG. 1B depicts an example data flow between some elements of an example system upon which aspects of this disclosure may be implemented.

FIG. 1B depicts an example data flow between some of the elements of the example system 100. In some implementations, the convergence engine 114 receives user data 140, contextual data 142, facility data 144 and/or map data 146. The data may be received from a data storage medium that stores data such as the data store 112. User data 140 may include current location and/or user history data such as location history data (e.g., the location at which the user works from each day of the week). Location data may be collected or inferred from a user's Internet Protocol (IP) address, GPS data, data relating to pinging a user's mobile device, network connection data (e.g., connection to a Wi-Fi in a building), health check data (e.g., when the user completes their health check at a specific building), and external data sources such as toll road data or public transportation data (e.g., train or bus tickets purchased). Location data may also be inferred from voice analysis conducted during a virtual meeting. For example, voice analysis may be performed to determine whether a user is in a conference room with other users or the user is attending the meeting remotely. Furthermore, location information may be inferred from organizational security data such as when the user uses a badge to enter a facility. It should be noted that in collecting and retrieving a user's geographical or other private data, care is taken to ensure all privacy guidelines and regulations are followed. For example, receiving a user's consent for collection, retrieval, storage and use of their data may be required.

In addition to location information, user data 140 may include user-provided preferences such as dietary restrictions, food preferences, types of venues preferred (e.g., indoor, outdoor, small venue, large venue, quiet venue), preferred mode of transportation (e.g., car, train, bus, etc.), accessibility limitations (e.g., wheelchair accessible, ADA accessible), whether they prefer to carpool or drive by themselves, and/or a number of other user preferences and/or requirements. This information may be provided directly by the user or may be inferred from other data, as discussed in detail below. User data 140 may also include calendar data and communications data such as data relating to messages (e.g., email, instant messages, text messages), data relating to calls, video calls and the like. The calendar and communications data may provide information about the user's possible location. For example, calendar data may indicate that the user has a meeting at a specific location prior to the designed meeting time. This information may also be retrieved and/or inferred from communications data (e.g., from emails, instant messages, and the like). User data 140 may include data for one or more of the potential meeting participants. In some implementations, user data 140 includes data for each one of the potential meeting participants. Meeting participants include each of the meeting invitees as well as the meeting organizer.

Contextual data 142 may include meeting data (e.g., meeting date/time, meeting participants, meeting title, etc.), organizational graph data relating to the people associated with a user, the user's title, the user's projects and the like. For example, data relating the user's coworkers, people with whom the user frequently works on the same projects or people that the user frequently meets with in person. Furthermore, contextual data 142 may include location history or current location information of users associated with the user, the level of association between the user and other users (this information may be retrieved or inferred from other data), and/or the level of connection between the user and other users (e.g., the number of recent connections, recency of the connections, etc.). In situations where a meeting participant's location cannot be predicted, location information for users that are closely associated with the meeting participant may be used to infer the meeting participant's location. For example, if it is known that a first individual often works in-person with a second individual, the second individual's location information may be used to infer the first individual's location.

Facility data 144 may include data collected from smart building features such as light sensors, building temperatures (e.g., when a room's temperature is changed by a user, that indicates that a user is in the room), use of a smart speaker in a room, use of a TV or other audio/video equipment, and/or use of appliances (e.g., coffee machine). Moreover, facility data may be collected from reservation systems. For example, organizations that enable their employees to reserve a space (e.g., workspace or conference room), may collect the reservation information, along with data about the person who made the reservation and/or a list of persons that will be at the reserved space. This information can be used to determine a user's location both in the past and in the future. Furthermore, reservation information may be used to determine vacancy rates and/or assist in identifying an available meeting location. Additionally, facility data may include a list of available meeting locations. This information may be retrieved from organization facility data (e.g., spaces available at an organization's office space) and/or from other resources that provide information about public/private facilities (e.g., restaurants, meeting venues, etc.). In an example, facility data may be retrieved from websites that provide information about restaurants and/or other publicly available meeting venues in a given geographical location. In some implementations, this information is provided via an application programming interface (API).

The map data 146 may include data related to geographical positions of various potential meeting locations, routes from and to one or more of the geographical positions, directions, route information, traffic information and the like. The map data 146 may be used to calculate distances between various positions, determine potential modes of transportation for travel between different locations, calculate potential travel time to a meeting location at a given time period in the future and the like. The map data 146 may be retrieved from sources that provide map related information. In some implementations, this information is provided via API that provides access to a map application.

Once the required user data 140, contextual data 142, facility data 144 and/or map data 146 have been received or retrieved by the convergence engine 114, some or all of the received data may be provided to a user location identifier engine 150 for identifying a user's location. This may include identifying a user's current location and/or predicting the user's future location. When location information is available from a user's calendar or from a reservation system (e.g., the user has a meeting scheduled at a specific location or has reserved a space at a specific time), the user location identifier engine 150 may use the information to predict the user's location. When, however, location information is not directly available, the user location identifier engine 150 may intelligently determine the user's current or future location using the user data 140 (e.g., current or past location data), contextual data 142, facility data 144 and/or map data 146. This may involve use of one or more ML models, such as the user location identifier model 152, for predicting the user's location based on past behavior and/or patterns in user behavior.

As a general matter, the methods and systems described herein may include, or otherwise make use of an ML model to, analyze various parameters relating to user location, user associations, meeting locations and/or facility usage. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various users and/or user actions, predict user locations, predict facility use and the like. Such training may be made following the accumulation, review, and/or analysis of data (e.g., user data and facility data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The user location identifier model 152 may receive the user data 140, contextual data 142, facility data 144 and/or map data 146 as inputs and analyze the data to predict meeting participants' locations at the given time period (e.g., within a time period prior to the planned meeting time, at the given meeting time and/or within a time period after the planned meeting time) based on patterns in user behavior and/or other parameters. For example, the user location identifier model 152 may examine user data 140 and facility data 144 to determine that a user often works from a specific office building on Tuesday mornings. Based on this information, the user location identifier model 152 may predict that the user will be located at that office building next Tuesday morning. In another example, the user location identifier model 152 may determine, based on received GPS data, that the user has been working at a specific coffeeshop for the past two week. Based on this information, the user location identifier model 152 may predict that the user will be working from the same coffeeshop next Tuesday morning. In some implementations, in addition to or instead of predicting the user location prior to the meeting time, the user location identifier model 152 may determine the user location after the meeting. For example, the user location identifier model may predict what location the user will be traveling time to after the meeting. This may help the users in not only getting to a meeting location but also taking into account where they need to go to after the meeting. In some examples, the users may be able to provide this information to the meeting scheduling application to have the information taking into consideration for identifying a meeting location.

In some implementations, the amount of time required prior to the designated meeting time is predetermined. For example, location information may be predicted within a 30-minutes time period prior to the designated meeting time. In alternative implementations, the amount of time required prior to the designated meeting time may be determined based on various parameters such as time of day, predicted amount of traffic around the designated meeting time within a geographical location and the like.

User data 140, contextual data 142, and/or facility data 144 may also be provided to a user preference determination engine 154 for determining meeting participant preferences. When user preference information is not available for a meeting participant and/or when the available user preference information does not include certain information, the user preference determination engine 154 may intelligently determine the user's preferences using the user data 140 (e.g., current or past location data), contextual data 142, and/or facility data 144 map data 146. This may involve use of one or more ML models, such as the user preference determination model 156, for predicting the user's preferences based on past behavior and/or patterns in user behavior. For example, if all of a user's previous lunch meeting have been at vegan restaurants, the user preference determination model 156 may infer that the user's dietary requirements include vegan meals. In another example, if GPS data indicates that the user often uses public transportation for traveling to and from meeting locations, the user preference determination model 156 may determine that the user is likely to prefer use of public transportation to arrive at the meeting location.

Once meeting participants' current or future locations and/or preferences have been determined, the information may be provided to the meeting location identifier engine 158 to determine an appropriate meeting location for the meeting. The meeting location identifier engine 158 may examine the determined meeting participant locations at or before (e.g., taking travel time into account) a meeting time and analyze the received user preferences such as venue types, transportation, and the like to identify potential meeting locations. Furthermore, the meeting location identifier engine 158 may retrieve venue data such as restaurants, coffee shops, outdoor spaces (e.g., parks), office spaces (e.g., company facilities) or other potential meeting location options within a given geographical location of the meeting participant's predicted locations. This information may be retrieved from the map data 146 or from a data store containing such information (e.g., Internet, organizational facility data, etc.). Venue data may include the types of food offered, the type of facility of a meeting location, parking information, accessibility and the like.

Furthermore, the meeting location identifier engine 158 may retrieve travel and map information from the map data 146 to determine travel times to a potential location. Travel information may include historical data relating to travel time on specific roads at a given time (e.g., usual traffic data). Travel information may also include data relating to different modes of transportation (e.g., whether a location is accessible by public transportation). The meeting location identifier engine 158 may analyze the received information (e.g., user location information, user preferences, venue information, map and travel information) to identify one or more potential meeting locations that are convenient to all, some or a specific meeting attendee (taking travel time, modes of transportation and/or accessibility data into account). For example, the meeting location identifier engine 158 may identify a location that is central to all meeting participants and/or satisfies a majority of meeting participants' requirements. Alternatively, the meeting location identifier engine 158 may identify a location that is closer to one or more but not all meeting participants. This may be based on user provided preferences. For example, the meeting organizer may specify the user(s) to whom the meeting location should be closely located. Analyzing the received data and identifying potential meeting locations may involve use of one or more ML models, such as the meeting location identifier model 160.

In some implementations, the meeting location identifier model 160 identifies a plurality of meeting locations that satisfy one or more user requirements. The meeting location identifier model 160 may provide a confidence score for each of the identified locations. The identified locations may then be ranked based on the confidence score and a number of identified locations that exceed a threshold confidence score may be selected for being presented to the meeting organizer. Data about the selected identified locations may be provided by the meeting location identifier engine 158 (e.g., by the meeting location identifier model 160) for display to the applications 116/124.

In some implementations, the applications 116/124 display the identified locations on a map. The map may also display the predicted location of one or more meeting attendees to enable the organizer to quickly determine the best option. Map information may be provided by the map data 146 and/or via a website or application that provides such information. In an example, the map display data is accessed via an API. This may be achieved by the convergence engine 114 and/or by the applications 116/124.

The convergence engine 114 may also include a reservation engine 162 to enable automatic reservation at a selected meeting location. The reservation engine 162 may have access to applications and/or webpages that provide reservation management services. In an example, the reservation engine may achieve this by utilizing an API. Alternatively, the reservation engine 162 may itself perform reservation management services such as making reservations at venues.

Once a user selects one of the identified locations, the convergence engine 162 may provide information about the selected location to the reservation engine 162 which may in turn communicate with a reservation management service (or use the information itself) to automatically reserve a space for the meeting. In an example, the reservation engine 162 receives the time/date, selected location, expected number of attendees, and/or any user restrictions or requirements (e.g., preference for outdoor space, wheelchair accessible, dietary restrictions, and the like) and utilizes the received information to make a reservation. In an alternative implementation, the reservation services are provided by the applications 116/124. For example, once the convergence engine 114 transmits the list of identified locations to the applications 116/124 for display to the user and the user selects one of the locations, the applications 116/124 may work directly with other applications or Internet pages to enable the organizer to reserve the selected meeting location directly from the applications 116/124 or by being redirected to another application that enables reservations. In one example, once the user selects an identified location, reservation is made automatically. In an alternative implementation, after selection has been made, an option is provided to the user to reserve the space. Once a reservation has been made, the applications 116/124 may enable the organizer to invite the meeting attendees and/or send notes, documents and/or reminders directly from the applications 116/124.

In some implementations, the applications 116/124 may provide an option to offer a poll with a few of the identified locations as choices to the meeting participants. For example, a link to a poll may be provided in the meeting invitation. The poll may enable the meeting participants to choose their desired location from the list. The location with the highest number of votes may then be automatically identified as the selected location. In some implementations, a user (e.g., meeting organizer) may need to review the poll results and select the location. Furthermore, the applications 116/124 may offer end-to-end coordination such as sending meeting invitations, sending automatic reminders, sending reports to meeting organizer of attendance and the like. Additionally or alternatively, the applications 116/124 may provide the ability to manage expenses associated with meetings. For example, the applications 116/124 may provide mechanisms for sending funds directly through the applications 116/124, providing a reminder to expense the costs, and/or auto enabling expensing costs of the meeting.

In some implementations, the applications 116/124 may provide options to the users to select the meeting location based on a geographic middle, based on travel time (e.g., travel time by car, public transportation or both), accessibility to public transit, ease of parking, carbon emissions spent on travel, locations where one or more attendees will have to travel to after the meeting, and more. For example, the applications 116/124 may provide UI options that filter the results based on distance, travel time, and/or other parameters.

Once a meeting has been scheduled at a specific location, the convergence engine 114 may help users identify meeting attendees with whom they can carpool or walk to the meeting location. This may be achieved by using the location information generated by the user location identifier model 152 to identify users that are within a given vicinity to each other prior to the meeting time to facilitate convergence before the meeting. As such, the applications 116/124 may provide options for users to indicate their desire to travel to the meeting location with other attendees and to receive a list of potential attendees to travel with in response. Furthermore, the applications 116/124 may enable a user to book a ride (such as a taxi, Uber, scooter, bike, shared car, campus shuttle, or other transportation) and/or reserve airfare and hotel accommodations from within the applications 116/124 (e.g., via APIs). Still further, the applications 116/124 may enable users to order resources required for a meeting (e.g., food, office supplies, chairs, swag, etc.) to the meeting location from within the applications 116/124.

In this manner, the convergence engine 114 may enable efficient and effective convergence between multiple users by enabling connections to take place at the right place. This is made possible by being able to automatically predict users' locations at a time in the future, automatically identify locations that meet user preferences and/or are convenient to the predicted locations. In this manner, the convergence engine 114 increases user efficiency and satisfaction and increases individual's opportunity frame for in-person convergence.

Figure 2:
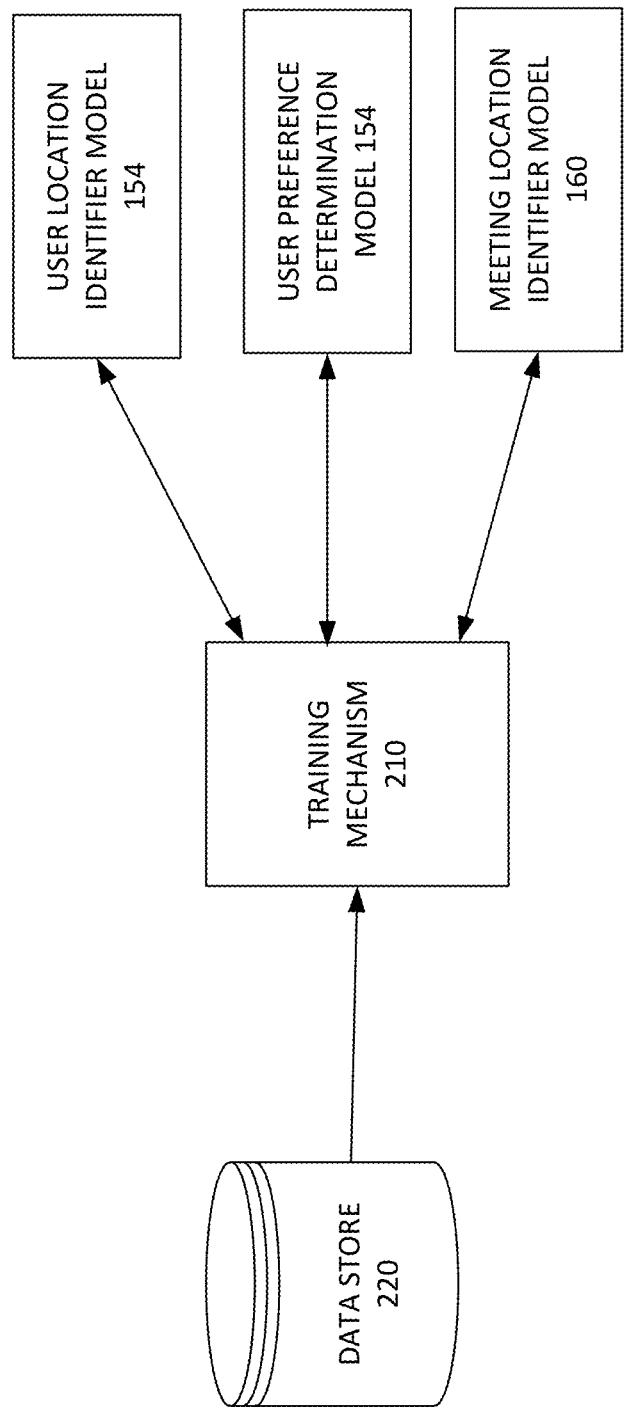
FIG. 2 depicts how one or more ML models used by a convergence engine may be trained.

FIG. 2 depicts how one or more ML models used by the convergence engine 114 may be trained by using the training mechanism 210. The training mechanism 210 may use labeled and/or unlabeled training data sets stored in the data store 220 to provide initial and ongoing training to the user location identifier model 154, user preference determination model 154 and/or meeting location identifier model 160. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

In some implementations, to provide ongoing training, the training mechanism 210 may use training data sets received from each of the ML models. Furthermore, data may be provided from the training mechanism 210 to the data store 220 to update one or more of the training datasets in order to provide updated and ongoing training. Additionally, the training mechanism 210 may receive training data such as knowledge from pre-trained mechanisms.

Figure 3A:
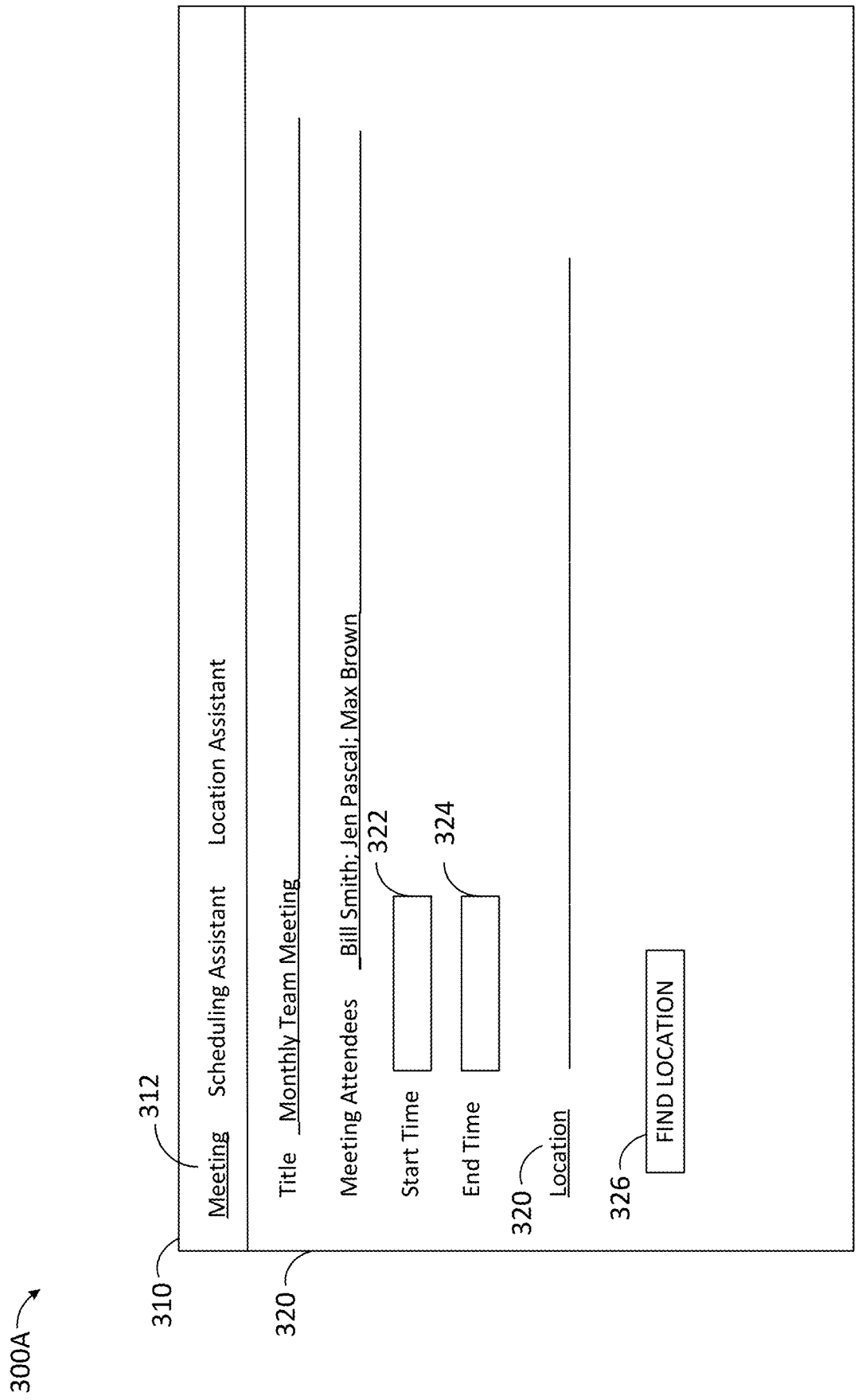
FIGS. 3A-3C depict example graphical user interface (GUI) screens of an application or service that facilitates convergence.
Figure 3B:
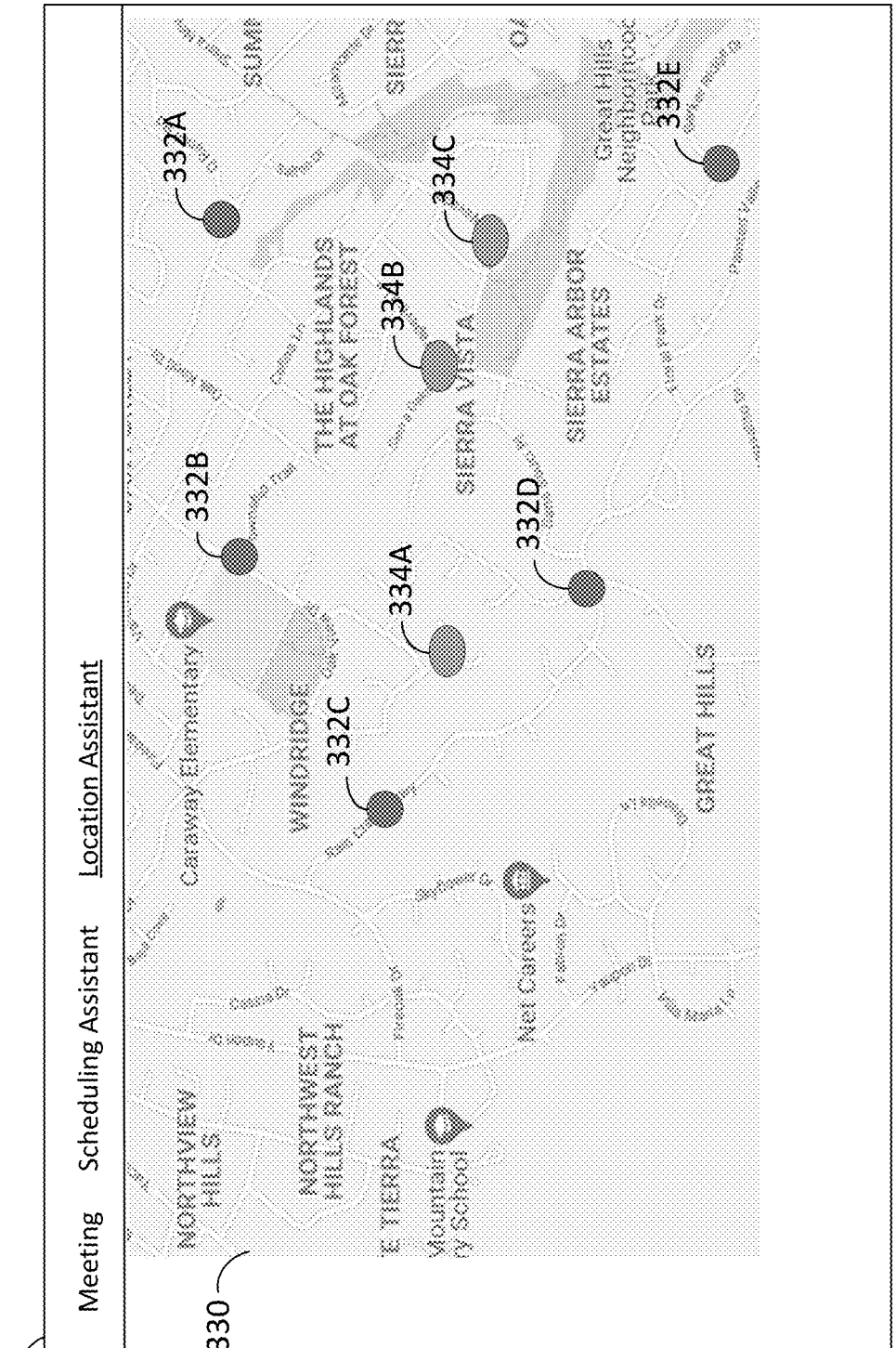
Figure 3C:
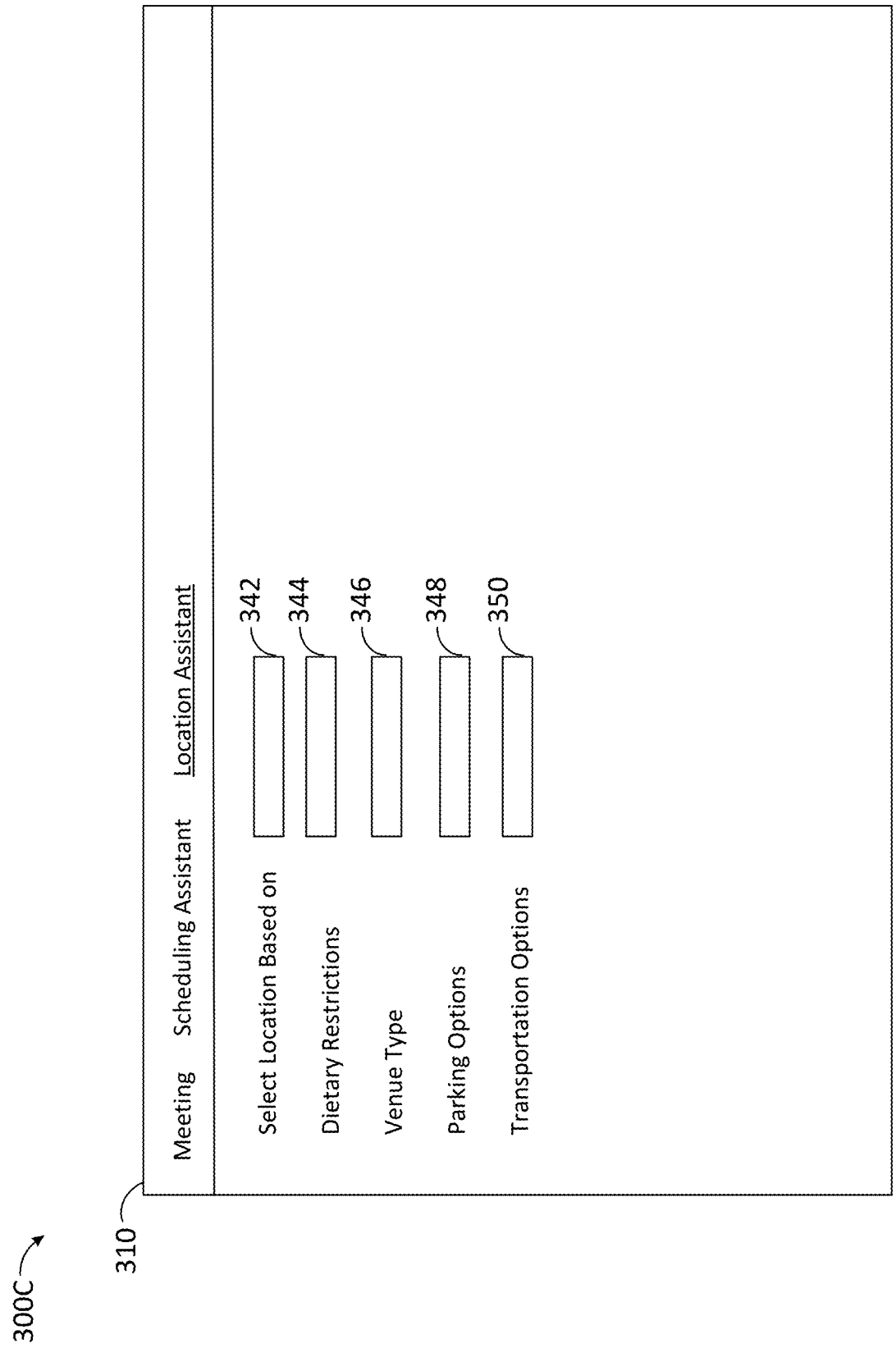

FIGS. 3A-3C depict example GUI screens of an application or service that facilitates convergence. FIG. 3A depicts an example GUI screen 300A of a calendar management application or communications application (e.g., Microsoft Outlook or Microsoft Teams) displaying an example meeting scheduling feature. GUI screen 300A may be displayed by an application that provides a feature for scheduling a meeting when the user selects a UI element for scheduling a new meeting or editing an already scheduled meeting. The GUI screen 300A may include a toolbar menu 310 displaying a number of tabs related to various aspects of scheduling a meeting. Selecting each tab of the toolbar menu 310 may result in display of different menu options. In an example, the meeting tab 312 displays the screen portion 320, which may include UI elements for entering a meeting title, inputting the names and/or contact information (e.g., email addresses) of the people that are being invited to the meeting, and UI elements 322 and 324 for selecting a start time/date and end time/date for the meeting.

Additionally, the screen portion 320 may include a UI element 320 for entering a selected meeting location, for instances where the organizer already has a meeting location in mind. For situations where the meeting location has not decided on a meeting location, the UI element 326 may be used to initiate the process of identifying potential meeting locations. Once the UI element 326 is selected, the application displaying the GUI screen 300A may transmit user data and/or contextual data about the meeting and/or meeting participants to a convergence engine such as the convergence engine 114 of FIGS. 1A-1B to assist in identifying potential meeting locations. In an example, upon selecting the UI element 320, a GUI screen such as the GUI screen 300B of FIG. 3B may be displayed.

The GUI screen 300B may include a map 330 displaying the predicted locations of the meeting participants, as well as identified potential meeting locations. The predicted locations of the meeting participants may be displayed on the map 330 using UI elements 332A-332E. In some implementations, upon selection (e.g., hovering over) each of the UI elements 332A-332E, more information about the location and/or meeting participant may be displayed. For example, hovering over one of the UI elements 332A-332E may result in the display of a pop-up menu that provides the name of the meeting participant that is predicted to be located at the identified location. This may be subject to compliance with privacy guidelines. For example, user consent may first need to be obtained prior to displaying a meeting participant's predicted location and/or displaying the name of the meeting participant who is predicted to be a certain location. Displaying the predicted locations of the meeting participants may be advantageous in enabling the user to gain an understanding of distances between the different meeting participants and the potential meeting locations.

The GUI screen 300B may display locations of identified meeting location options using UI elements 334A-334C. This provides a quick overview to the user of the available meeting location options, their vicinity to various meeting participants and/or route options to get to each of the portion meeting locations. In an example, selection of each of the UI elements 334A-334C may result in the display of additional information about the potential meeting location. For example, meeting location name, type of venue (e.g., restaurant, office building, hotel conference room, etc.), types of food offered and the like. Once the user views the additional information, a menu option may be presented for selecting the identified meeting location. In an example, once the user selects a meeting location, the screen may be returned to the GUI screen 300A with the selected location displayed as an input in the UI element 320. In some implementations, selecting a potential meeting location in the GUI screen 300B results in the automatic reservation of the selected location. Alternatively, a UI element may be displayed that enables the user to submit a request for making a reservation, in which case the user may be taken to another website and/or application for making the reservation, or options may be provided to making the reservation directly from the GUI screen 300B.

In some implementations, a meeting scheduling application provides options for the users to select desired preferences for a meeting and/or individually. In an example, these options are provided under a location assistant tab as displayed in the GUI screen 300C of FIG. 3C. The location assistance tab may enable the user to choose to select the location based on various selectable options presented in a UI element 342. The UI element 342 may be a dropdown menu that enables the user to choose from options such as travel time, distance, accessibility options, and the like. The UI element 344 may be a dropdown menu that enables the user to choose dietary restrictions. Similarly, the UI element 346 may allow the user to choose a preferred venue type, while the UI element 348 enables the user to choose parking options (e.g., paid parking, free parking, valet parking, etc.). The UI element 350 may also be a dropdown menu that allows the user to select their preferred mode of transportation (e.g., public, personal car, etc.). The options provided on screen 300C may be provided to each user. For example, users may be able to choose these options when setting up a user profile. The UI elements 342, 344, 346, 348 and 350 may also be provided to a meeting organizer to choose the desired preferences for a specific meeting.

FIG. 4 is a flow diagram depicting an example method 400 for intelligently facilitating scheduling of an in-person meeting. One or more steps of the method 400 may be performed by a convergence engine such as the convergence engine 114 of FIGS. 1A-1B or by an application such as applications 116/124 of FIGS. 1A-1B. The method 400 may begin, at 405, and proceed to receive a request to identify a meeting location for an in-person meeting, at 410. This may occur, for example, during the process of scheduling a meeting and/or inviting one or more individuals to a meeting. For example, a UI screen for scheduling the meeting may include a UI element for requesting meeting location recommendations. In another example, a request for identifying potential meeting locations may be transmitted when the user begins adding meeting participant names to a meeting invitation. For example, the application used to schedule the meeting may automatically transmit a request for identifying potential meeting locations based on the names and/or predicted locations of the meeting participants and/or meeting organizer.

Once a request for identifying meeting locations has been received, method 400 may proceed to retrieve at least one of user data, contextual data, facility data and map data, at 415. As discussed above in detail with respect to FIG. 1B, contextual data may include meeting data such as the time and date for the meeting. User data and/or contextual data may also include a list of the meeting participants and additional information about one or more of the meeting participants. Once all of the required data is available, at least one of the user data, contextual data, facility data and map data may be provided to a trained ML model for predicting the location of one or more of the meeting participants, at 420. The trained ML model may be a model such as the user location identifier model 152 of FIG. 1B, which may utilize parameters such as user data, contextual data and facility data to predict a meeting participant's location at or before the meeting time.

After providing the inputs to the ML model, method 400 may proceed to receive predicted meeting participant locations as an output, at 425. Method 400 may then utilize the predicted locations as well as other parameters such as user data, contextual data, facility data and/or map data to identify a potential meeting location for the meeting based on the predicted locations and/or one or more of the other parameters, at 430. Once one or more potential meeting locations are identified, the identified meeting locations may be provided for display, at 435. This may involve transmitting display data to an application. In some implementations, the display data includes map data and information related to a UI element that presents the identified potential meeting locations on a map on a display screen. Once, the data is provided for display, method 400 may end at 440.

Figure 5:
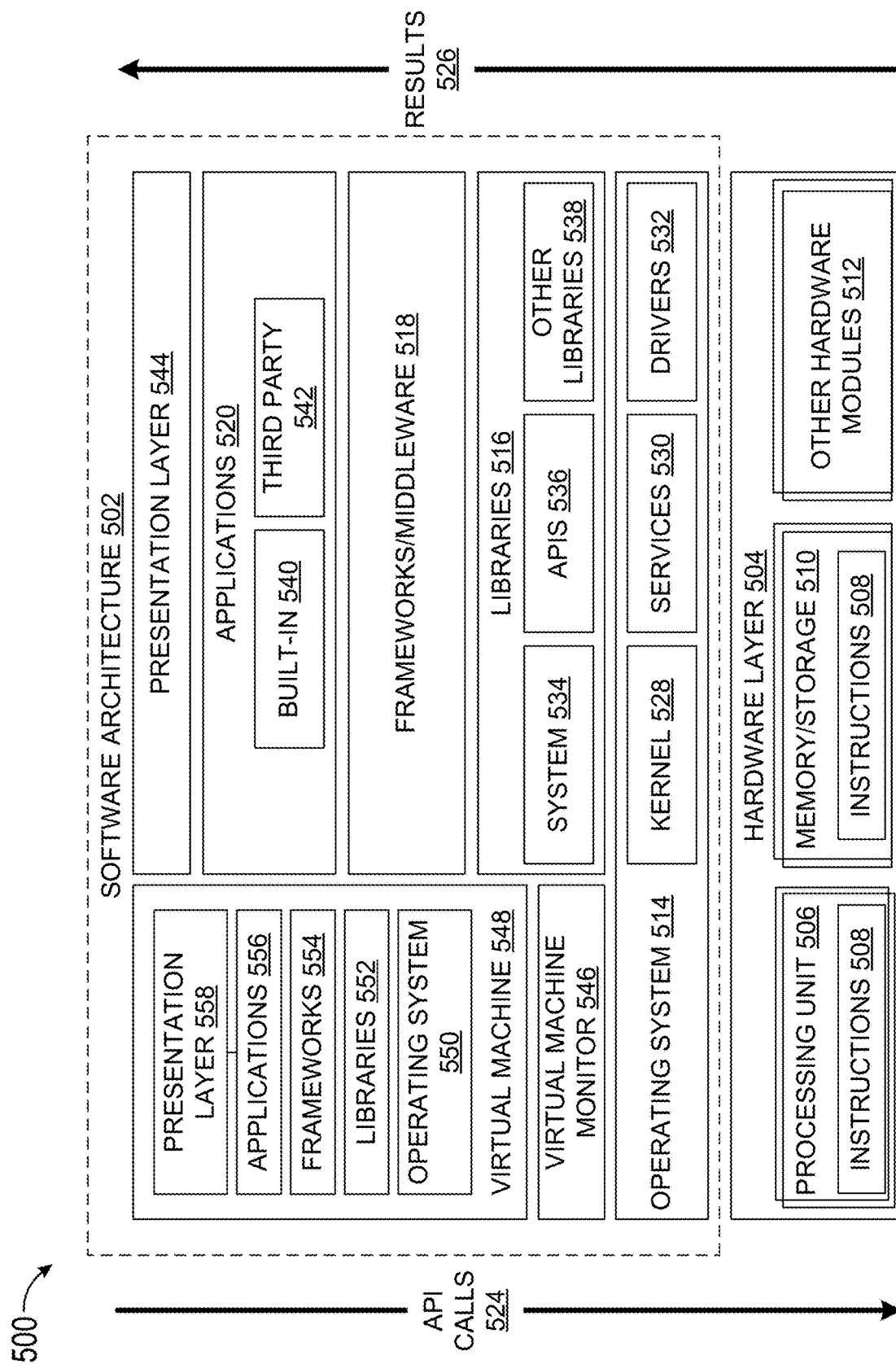
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
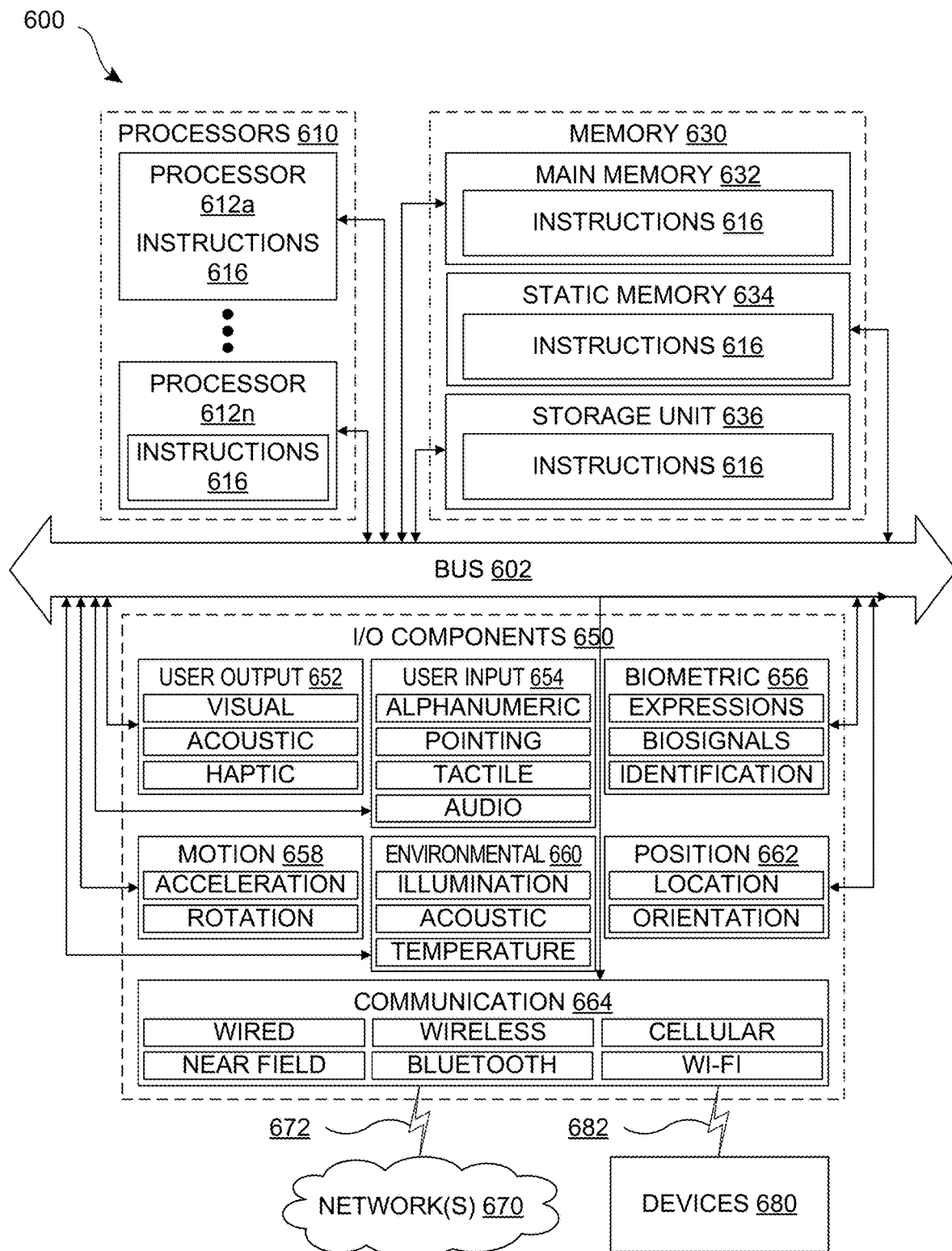
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
  a processor; and
  a memory in communication with the processor, the memory comprising executable instructions that, when executed by the processor, cause the data processing system to perform functions of:
    receiving a request to schedule a meeting at a meeting time;
    retrieving at least one of user data, contextual data, facility data and map data, the user data including a list of a plurality of meeting participants for the meeting;
    providing at least one of the list of the plurality of meeting participants, the meeting time, the user data, and the facility data to a trained machine-learning (ML) model for predicting a location at which two or more of the plurality of meeting participants will be located within a given time period prior to the meeting time;
    receiving the predicted location as an output from the trained ML model; and
    identifying a meeting location from among one or more meeting venues based on the predicted location of the two or more of the plurality of meeting participants; and
    providing the meeting location for display in a first selectable user interface element.

Item 2. The data processing system of item 1, wherein at least one of the user data or contextual data includes at least one of a user preference for one or more of the plurality of meeting participant and an accessibility requirement for one or more of the plurality of meeting attendees, and the meeting location is identified based on the predicted location and at least one of the user preference or accessibility requirement.

Item 3. The data processing system of item 2, wherein the user preference includes at least one of preferred mode of transportation, dietary restrictions, venue preferences, parking preferences, and carbon emission preferences.

Item 4. The data processing system of any preceding item, wherein the meeting location is identified based on geographic proximity of the predicted location of the two or more of the plurality of meeting participants to venue locations of the one or more meeting venues.

Item 5. The data processing system of any preceding item, wherein the meeting location is identified based on travel time from the predicted location of the two or more of the plurality of meeting participants to venue locations of the one or more meeting venues.

Item 6. The data processing system of any preceding item, wherein the meeting location is provided for display on a map.

Item 7. The data processing system of any preceding item, wherein the memory comprises executable instructions that, when executed by processor, further cause the data processing system to perform functions of providing a second selectable user interface element for automatically making a reservation at the identified meeting location for the meeting.

Item 8. The data processing system of any preceding item, wherein the meeting location is identified based on travel time from the meeting location to a location to which one or more of the plurality of meeting participants will travel to after the meeting.

Item 9. A method for identifying a meeting location for a meeting comprising:
  receiving a request to schedule the meeting at the meeting time;
  retrieving at least one of user data, contextual data, facility data and map data, the user data including a list of a plurality of meeting participants for the meeting;
  providing at least one of the list of the plurality of meeting participants, the meeting time, the user data, and the facility data to a trained machine-learning (ML) model for predicting a location at which two or more of the plurality of meeting participants will be located within a given time period prior to the meeting time;

receiving the predicted location as an output from the trained ML model; and identifying a meeting location from among one or more meeting venues based on the predicted location of the two or more of the plurality of meeting participants; and providing the meeting location for display in a first selectable user interface element.

Item 10. The method of item 9, wherein the meeting location is identified based on geographic proximity of the predicted location of the two or more of the plurality of meeting participants to venue locations of the one or more meeting venues.

Item 11. The method of items 9 or 10, wherein the meeting location is identified based on travel time from the predicted location of the two or more of the plurality of meeting participants to venue locations of the one or more meeting venues.

Item 12. The method of any of items 9-11, wherein the meeting location is provided for display on a map.

Item 13. The method of any of items 9-12, further comprising providing a second selectable user interface element for automatically making a reservation at the identified meeting location for the meeting.

Item 14. The method of any of items 9-13, wherein the meeting location is identified based on travel time from the meeting location to a location to which one or more of the plurality of meeting participants will travel to after the meeting.

Item 15. A non-transitory computer readable medium on which are stored instructions that, when executed, cause a programmable device to perform functions of:

receiving a request to schedule a meeting at a meeting time;

retrieving at least one of user data, contextual data, facility data and map data, the user data including a list of a plurality of meeting participants for the meeting;

providing at least one of the list of the plurality of meeting participants, the meeting time, the user data, and the facility data to a trained machine-learning (ML) model for predicting a location at which two or more of the plurality of meeting participants will be located within a given time period prior to the meeting time;

receiving the predicted location as an output from the trained ML model; and identifying a meeting location from among one or more meeting venues based on the predicted location of the two or more of the plurality of meeting participants; and providing the meeting location for display in a first selectable user interface element.

Item 16. The data processing system of item 15, wherein the meeting location is identified based on geographic proximity of the predicted location of the two or more of the plurality of meeting participants to venue locations of the one or more meeting venues.

Item 17. The non-transitory computer readable medium of items 15 or 16, wherein the meeting location is identified based on travel time from the predicted location of the two or more of the plurality of meeting participants to venue locations of the one or more meeting venues.

Item 18. The non-transitory computer readable medium of any of items 15-17, wherein the memory comprises executable instructions that, when executed by processor, further cause the data processing system to perform functions of providing a second selectable user interface element for automatically making a reservation at the identified meeting location for the meeting.

Item 19. The non-transitory computer readable medium of any of items 15-18, wherein the meeting location is provided for display on a map.

Item 20. The non-transitory computer readable medium of any of items 15-19, wherein the meeting location is identified based on travel time from the meeting location to a location to which one or more of the plurality of meeting participants will travel to after the meeting.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An improved data processing system for facilitating convergence between people comprising:
   a processor; and
   a memory in communication with the processor, the memory comprising executable instructions that, when executed by the processor, cause the data processing system to perform functions of:
      receiving a request to schedule a meeting at a meeting time;
      retrieving, at a user location identifier engine, at least one of user data, contextual data, facility data and map data, the user data including a list of a plurality of meeting participants for the meeting, the user location identifier engine including a user location identifier machine-learning (ML) model trained with an initial training set, and the facility data including data collected from smart building features;
      providing the facility data and at least one of the list of the plurality of meeting participants, the meeting time, and the user data to the trained user location identifier ML model for predicting a location at which two or more of the plurality of meeting participants will be located within a given time period prior to the meeting time, the trained user location identifier ML model determining a set of predicted user locations based on the facility data and at least one of the list of the plurality of meeting participants, the meeting time, and the user data;
      receiving the set of predicted user locations by the user location identifier engine from the trained user location identifier ML model, wherein the trained user location identifier ML model identifies patterns in user activity, and determines associations between users, predicted facility use, and the set of predicted user locations;
      continually training the trained user location identifier ML model with an ongoing training set that includes the user data and the facility data having been accumulated and analyzed over time, and with supplemental training data received from a user device;
      identifying a meeting location from among one or more meeting venues based on the set of predicted user locations of the two or more of the plurality of meeting participants;
      providing the meeting location for display in a first selectable user interface element; and
      providing a second selectable user interface element for automatically making a reservation at the identified meeting location for the meeting.

2. The data processing system of claim 1, wherein at least one of the user data or contextual data includes at least one of a user preference for one or more of the plurality of meeting participants and an accessibility requirement for one or more of the plurality of meeting participants, and the meeting location is identified based on the predicted location and at least one of the user preference or the accessibility requirement.

3. The data processing system of claim 2, wherein the user preference includes at least one of preferred mode of transportation, dietary restrictions, venue preferences, parking preferences, and carbon emission preferences.

4. The data processing system of claim 1, wherein the meeting location is identified based on geographic proximity of the predicted location of the two or more of the plurality of meeting participants to venue locations of the one or more meeting venues.

5. The data processing system of claim 1, wherein the meeting location is identified based on travel time from the predicted location of the two or more of the plurality of meeting participants to venue locations of the one or more meeting venues.

6. The data processing system of claim 1, wherein the meeting location is provided for display on a map.

7. The data processing system of claim 1, wherein the meeting location is identified based on travel time from the meeting location to a location to which one or more of the plurality of meeting participants will travel to after the meeting.

8. A method for identifying a meeting location for a meeting comprising:
   receiving a request to schedule the meeting at a meeting time;
   retrieving, at a user location identifier engine, at least one of user data, contextual data, facility data and map data, the user data including a list of a plurality of meeting participants for the meeting, the user location identifier engine including a user location identifier machine-learning (ML) model trained with an initial training set and the facility data including data collected from smart building features;
   providing the facility data and at least one of the list of the plurality of meeting participants, the meeting time, and the user data to the trained user location identifier ML model for predicting a location at which two or more of the plurality of meeting participants will be located within a given time period prior to the meeting time, the trained user location identifier ML model determining a set of predicted user locations based on the facility data and at least one of the list of the plurality of meeting participants, the meeting time, and the user data;
   receiving the set of predicted user locations by the user location identifier engine from the trained user location identifier ML model wherein the trained user location identifier ML model identifies patterns in user activity, and determines associations between users, predicted facility use, and the set of predicted user locations;
   continually training the trained user location identifier ML model with an ongoing training set that includes the user data and the facility data having been accumulated and analyzed over time, and with supplemental training data received from a user device;
   identifying a meeting location from among one or more meeting venues based on the set of predicted user locations of the two or more of the plurality of meeting participants;

providing the meeting location for display in a first selectable user interface element; and providing a second selectable user interface element for automatically making a reservation at the identified meeting location for the meeting.

9. The method of claim 8, wherein the meeting location is identified based on geographic proximity of the predicted location of the two or more of the plurality of meeting participants to venue locations of the one or more meeting venues.

10. The method of claim 8, wherein the meeting location is identified based on travel time from the predicted location of the two or more of the plurality of meeting participants to venue locations of the one or more meeting venues.

11. The method of claim 8, wherein the meeting location is provided for display on a map.

12. The method of claim 8, wherein the meeting location is identified based on travel time from the meeting location to a location to which one or more of the plurality of meeting participants will travel to after the meeting.

13. A non-transitory computer readable medium on which are stored instructions that, when executed, cause a programmable device to perform functions of:

receiving a request to schedule a meeting at a meeting time;

retrieving, at a user location identifier engine, at least one of user data, contextual data, facility data and map data, the user data including a list of a plurality of meeting participants for the meeting, the user location identifier engine including a user location identifier machine-learning (ML) model trained with an initial training set and the facility data including data collected from smart building features;

providing the facility data and at least one of the list of the plurality of meeting participants, the meeting time, and the user data to the trained user location identifier ML model for predicting a location at which two or more of the plurality of meeting participants will be located within a given time period prior to the meeting time, the trained user location identifier ML model determining a set of predicted user locations based on the facility data and at least one of the list of the plurality of meeting participants, the meeting time, and the user data;

receiving the set of predicted user locations by the user location identifier engine from the trained user location identifier ML model, wherein the trained user location identifier ML model identifies patterns in user activity, and determines associations between users, predicted facility use, and the set of predicted user locations;

continually training the trained user location identifier ML model with an ongoing training set that includes the user data and the facility data having been accumulated and analyzed over time, and with supplemental training data received from a user device;

identifying a meeting location from among one or more meeting venues based on the set of predicted user locations of the two or more of the plurality of meeting participants;

providing the meeting location for display in a first selectable user interface element; and providing a second selectable user interface element for automatically making a reservation at the identified meeting location for the meeting.

14. The non-transitory computer readable medium of claim 13, wherein the meeting location is identified based on geographic proximity of the predicted location of the two or more of the plurality of meeting participants to venue locations of the one or more meeting venues.

15. The non-transitory computer readable medium of claim 13, wherein the meeting location is identified based on travel time from the predicted location of the two or more of the plurality of meeting participants to venue locations of the one or more meeting venues.

16. The non-transitory computer readable medium of claim 13, wherein the meeting location is provided for display on a map.

17. The non-transitory computer readable medium of claim 13, wherein the meeting location is identified based on travel time from the meeting location to a location to which one or more of the plurality of meeting participants will travel to after the meeting.

* * * * *